US007814090B2

(12) United States Patent
Dhamija et al.

(10) Patent No.: US 7,814,090 B2
(45) Date of Patent: Oct. 12, 2010

(54) QUERY GENERATOR

(75) Inventors: Jitendra Dhamija, Karnataka (IN); Suresh Mali, Bangalore (IN); Christopher Evans, Bristol (GB); Paolo Fragapane, Bristol (GB); James Steadman, Bath (GB); Andrew Osborn, Bristol (GB)

(73) Assignee: Oracle International Corporation, Redwood Shores, CA (US)

( * ) Notice: Subject to any disclaimer, the term of this patent is extended or adjusted under 35 U.S.C. 154(b) by 360 days.

(21) Appl. No.: 11/140,201

(22) Filed: May 31, 2005

(65) Prior Publication Data

US 2006/0271529 A1 Nov. 30, 2006

(51) Int. Cl.
G06F 7/00 (2006.01)
(52) U.S. Cl. ..................................... 707/713
(58) Field of Classification Search ............... 707/2–5, 707/101, 713, 714
See application file for complete search history.

(56) References Cited

U.S. PATENT DOCUMENTS

| | | | | |
|---|---|---|---|---|
| 5,345,585 A * | 9/1994 | Iyer et al. | ..................... | 707/2 |
| 5,537,590 A * | 7/1996 | Amado | ..................... | 707/2 |
| 5,557,791 A * | 9/1996 | Cheng et al. | ..................... | 707/2 |
| 5,666,525 A * | 9/1997 | Ross | ..................... | 707/2 |
| 5,751,949 A * | 5/1998 | Thomson et al. | ..................... | 726/4 |
| 5,797,136 A * | 8/1998 | Boyer et al. | ..................... | 707/2 |
| 5,907,846 A * | 5/1999 | Berner et al. | ..................... | 707/103 R |
| 5,991,754 A * | 11/1999 | Raitto et al. | ..................... | 707/2 |
| 6,226,637 B1 * | 5/2001 | Carey et al. | ..................... | 707/4 |
| 6,282,547 B1 * | 8/2001 | Hirsch | ..................... | 707/102 |
| 6,289,335 B1 * | 9/2001 | Downing et al. | ..................... | 707/3 |
| 6,374,263 B1 * | 4/2002 | Bunger et al. | ..................... | 707/201 |
| 6,477,525 B1 * | 11/2002 | Bello et al. | ..................... | 707/3 |
| 6,477,527 B2 * | 11/2002 | Carey et al. | ..................... | 707/4 |
| 6,484,162 B1 * | 11/2002 | Edlund et al. | ..................... | 707/3 |
| 6,629,094 B1 * | 9/2003 | Colby et al. | ..................... | 707/4 |
| 6,718,320 B1 * | 4/2004 | Subramanian et al. | ..................... | 707/2 |
| 6,885,990 B1 * | 4/2005 | Ohmori et al. | ..................... | 704/270 |
| 7,158,994 B1 * | 1/2007 | Smith et al. | ..................... | 707/103 R |
| 7,181,435 B2 * | 2/2007 | Cambot et al. | ..................... | 707/1 |
| 7,225,189 B1 * | 5/2007 | McCormack et al. | ..................... | 707/10 |
| 2001/0051949 A1 * | 12/2001 | Carey et al. | ..................... | 707/103 R |
| 2002/0010695 A1 * | 1/2002 | Kearsey et al. | ..................... | 707/3 |
| 2002/0095405 A1 * | 7/2002 | Fujiwara | ..................... | 707/3 |
| 2003/0046639 A1 * | 3/2003 | Fai et al. | ..................... | 715/513 |
| 2003/0069877 A1 * | 4/2003 | Grefenstette et al. | ..................... | 707/2 |
| 2004/0220911 A1 * | 11/2004 | Zuzarte et al. | ..................... | 707/3 |

(Continued)

Primary Examiner—John R. Cottingham
Assistant Examiner—Mohammed R Uddin
(74) Attorney, Agent, or Firm—Hanify & King, P.C.

(57) ABSTRACT

A query generator for generating a query for retrieving data from a database comprising at least one table is disclosed. The query refers to one or more data items in a first view defined to expose a portion of the database and to one or more data items that are not exposed by the first view, at least one of which has an associated reach through flag set thereby defining it as a reach through item. The query generator is adapted to: receive user input indicating selected items to be retrieved from the database; ascertain whether any of the selected items that are not exposed by the first view are defined as reach through items; and, if so: create a second view that is a copy of the first view and add a copy of each reach through item to it; and create a query that refers only to the second view and the items exposed by it.

18 Claims, 3 Drawing Sheets

U.S. PATENT DOCUMENTS

| | | | |
|---|---|---|---|
| 2004/0225666 A1* | 11/2004 | Hinshaw et al. | 707/100 |
| 2005/0038673 A1* | 2/2005 | Stookey et al. | 705/2 |
| 2005/0091253 A1* | 4/2005 | Cragun et al. | 707/102 |
| 2006/0004794 A1* | 1/2006 | Pizzo et al. | 707/100 |
| 2006/0036568 A1* | 2/2006 | Moore et al. | 707/1 |
| 2007/0203933 A1* | 8/2007 | Iversen et al. | 707/102 |
| 2007/0219951 A1* | 9/2007 | Ahmed et al. | 707/2 |
| 2007/0239744 A1* | 10/2007 | Bruno et al. | 707/101 |
| 2008/0034283 A1* | 2/2008 | Gragun et al. | 715/232 |

* cited by examiner

QUERY GENERATOR

BACKGROUND OF THE INVENTION

1. Field of the Invention

This invention relates to a query generator and to a method for generating queries, in particular for use with relational databases.

2. Description of Related Art

Query generators, for example Discoverer® from Oracle®, are used to construct database queries which are then sent to a database for execution. The user constructs a query by selecting items from a drop-down list of items displayed on the screen. The items represent data which are to be obtained from the database. In addition, the user may select one or more operations that are to be performed on the data. Once the items and operations have been selected, the query generator automatically generates a query, usually in structured query language (SQL), for execution by the database.

It is common with complex databases to define a view that exposes only some parts of a database which the majority of users typically require to access. Such a view is useful since it abstracts some of the complexity of the underlying data structure from the users whilst allowing them to see the data that they generally require to see. However, whilst a particular view may suffice for most of the users of a database there may be some users who require to see not only the data exposed by the view but also data from the database that are not exposed by the view.

In a query tool, a user can select the items to be retrieved from one or more tables or views of the database. In Oracle® Discoverer® these are known as folders. Once an item has been selected from one table or view (or folder), it is possible to select an item from another folder by way of a join, which may be created by the database administrator. In the case of Oracle® Discoverer®, a metadata item is held indicating that a join has been defined between two folders, and also which items are required to be retrieved from the database. Such a join may be created between entirely unrelated tables or views and may be an inner join or an outer join.

For example, FIG. 2 shows a table T in a database. A view V has been defined which exposes a column C1 in the table T (and may expose other items from the database including those from other tables). If a user requires to retrieve the data items from column C1 of view V and also the corresponding data items from column 2 of table T they would select these items from a list in a tool such as Oracle® Discoverer® which would then generate the SQL statement shown below:

SELECT T.C2, V.C1

FROM T, V

WHERE T.C1=V.C1

As can be seen, this SQL statement refers to items from table T and from view V, and corresponding items are paired by virtue of the join condition T.C1=V.C1. In actual fact, this statement will be reduced to that shown below in which the reference to V is replaced by its SQL definition as an inline view:

SELECT T.C2, V.C1

FROM T, (SELECT C1 FROM T) V

WHERE T.C1=V.C1

As can be seen, this SQL statement refers to table T twice (by reference to columns T.C1 and T.C2). In addition, by virtue of the definition of the inline view V (i.e. that it is based entirely on table T), the SQL statement also causes execution of a join from table T back to itself. This is obviously inefficient, and in a complex database with a large number of tables, creating redundant joins for all these tables can waste a large amount of processing time.

BRIEF SUMMARY OF THE INVENTION

In accordance with one aspect of the present invention, there is provided a query generator for generating a query for retrieving data from a database comprising at least one table, the query referring to one or more data items in a first view defined to expose a portion of the database and to one or more data items that are not exposed by the first view, at least one of which has an associated reach through flag set thereby defining it as a reach through item, wherein the query generator is adapted to:

a) receive user input indicating selected items to be retrieved from the database;

b) ascertain whether any of the selected items that are not exposed by the first view are defined as reach through items; and, c) if so:

i) create a second view that is a copy of the first view and add a copy of each reach through item to it; and ii) create a query that refers only to the second view and the items exposed by it.

In accordance with a second aspect of the present invention, there is provided a method for generating a query for retrieving data from a database comprising at least one table, the query referring to one or more data items in a first view defined to expose a portion of the database and to one or more data items that are not exposed by the first view, at least one of which has an associated reach through flag set thereby defining it as a reach through item, wherein the method comprises:

a) receiving user input indicating selected items to be retrieved from the database;

b) ascertaining whether any of the selected items that are not exposed by the first view are defined as reach through items; and, c) if so:

i) creating a second view that is a copy of the first view and adding a copy of each reach through item to it; and ii) creating a query that refers only to the second view and the items exposed by it.

Hence, by allowing certain items to be defined as reach through items and detecting whether any of the selected items that are not exposed by the first view are reach through items it is possible to create a second view and a query that refers only to this view such that the redundant join is never created.

Of course, the query created in step (c)(ii) is normally then executed on the database. Normally, the database will be a relational database.

The second view is normally transient in nature. Hence, after the query has been executed, it is advantageous to delete the second view since this is only needed transitorily.

Preferably, the second view and first view are stored in separate memories. Normally the second view will be stored in a solid state random access memory in a client computer which generates the query and transmits it to a server computer, which is connected to the database and which executes the query. The first view is normally stored on the database, which can only be accessed relatively slowly. By storing the second view in the internal, solid state memory, very fast access to the metadata making up the query is permitted.

Within the query generator, the query is normally represented as a set of metadata items indicating the items to be retrieved and the objects within which each of these items are stored.

The objects within which the items are stored may include a table in the database and a view defined to expose a portion of the database.

Typically, the query is subsequently converted into an SQL query.

In accordance with a third aspect of the present invention, a computer program comprises program code means adapted to perform the method of the second aspect of the invention when said program is run on a computer.

In accordance with a fourth aspect of the invention, a computer program product comprises program code means stored on a computer readable medium for performing a method of the second aspect of the invention when said program is run on a computer.

BRIEF DESCRIPTION OF THE SEVERAL VIEWS OF THE DRAWINGS

An embodiment of the invention will now be described with reference to the accompanying drawings in which.

DETAILED DESCRIPTION OF THE INVENTION

Figure 1:
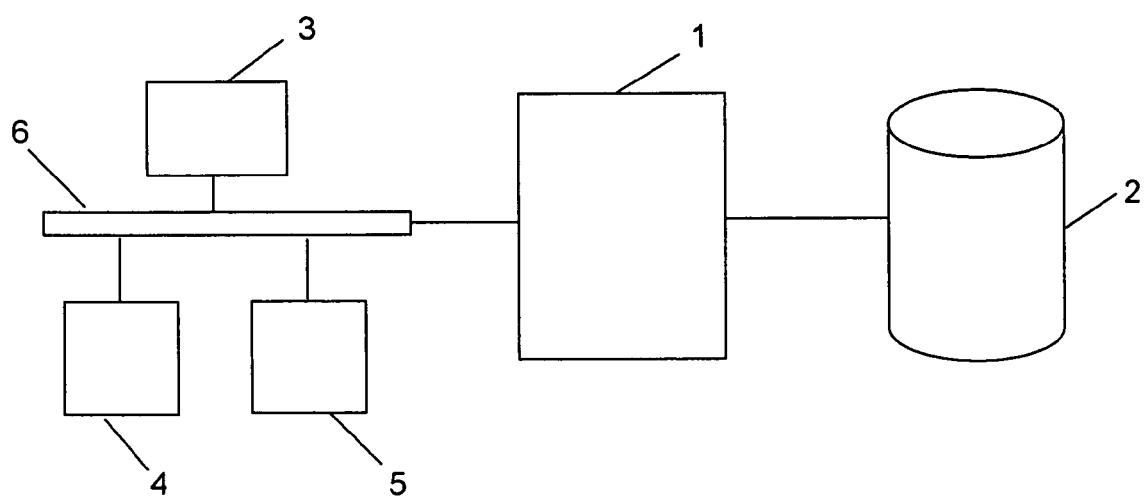
FIG. 1 shows a query generation system on which the invention may be implemented.

FIG. 1 shows a server 1 which is connected to a database 2. The server 1 is operable to receive queries from client computers 3, 4, 5 via a network 6. This network 6 may be a Local Area Network (LAN) or indeed it may be the Internet. Each of the client computers 3, 4, 5 runs query generator software that can construct a query in response to user input and transmit the query over network 6 to the server 1. The server 1 then executes the received query and extracts the necessary data from database 2 and performs any necessary computations on the extracted data before returning the results over the network 6 to the respective client computer 3, 4 or 5.

Figure 2:
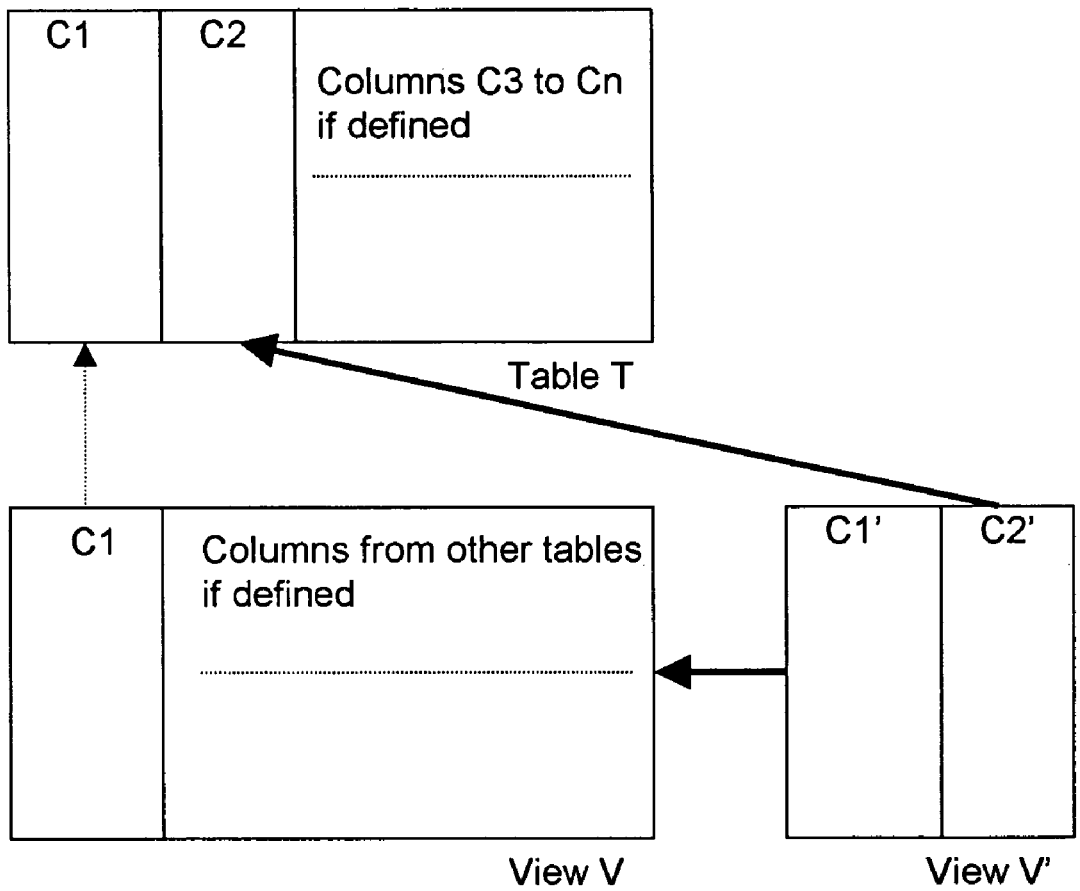
FIG. 2 shows a sample database for the purpose of illustrating the operation of the invention.

FIG. 2 shows a database schema within which the present invention may be used. The schema has a table T with a plurality of columns indicated as C1, C2 etc. A view V has been defined which exposes the column C1 from table T and may expose other items from the database. In this example, a user wishes to retrieve column C1 from view V along with the corresponding items from column C2 in table T.

Figure 3:
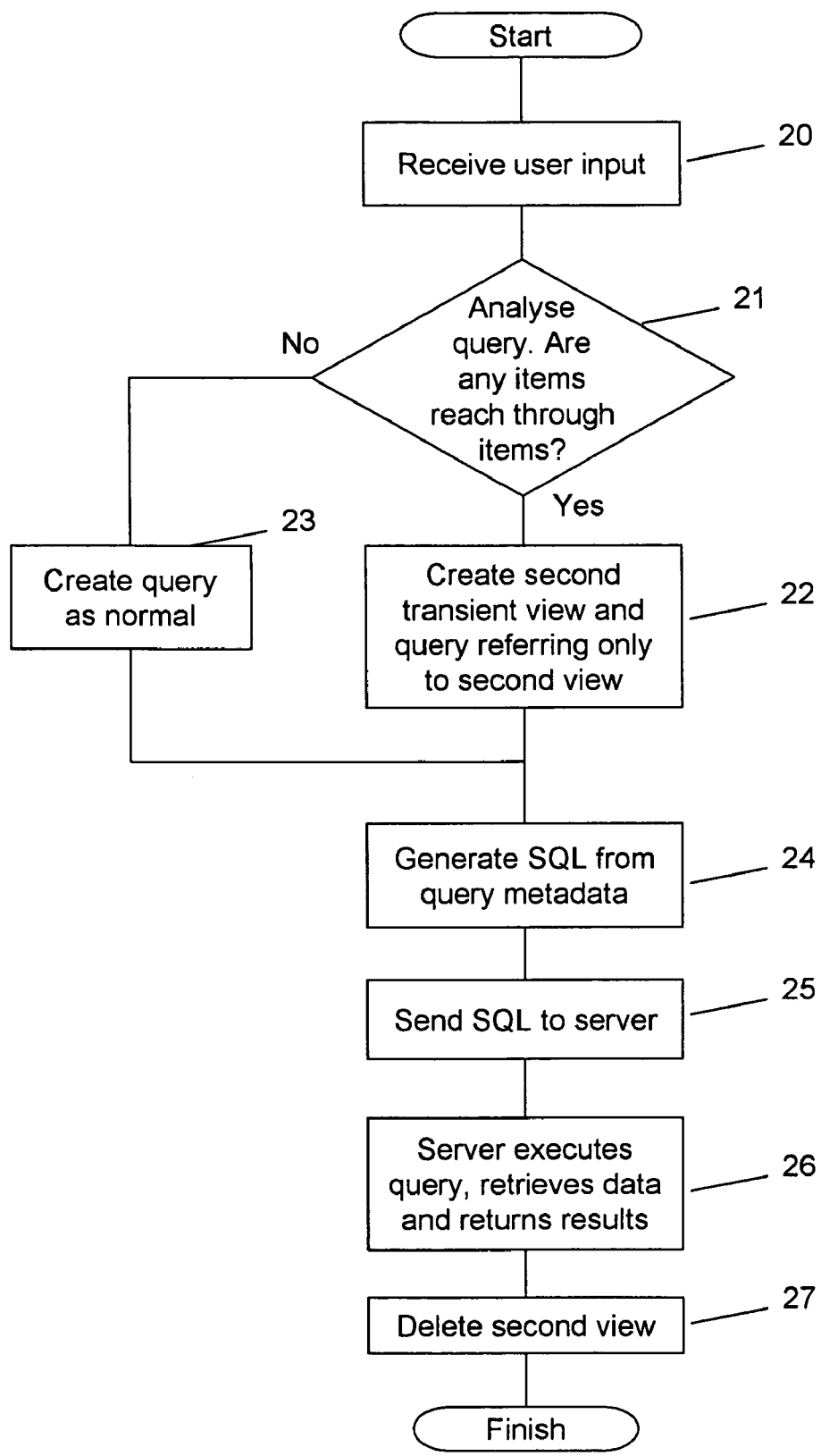
FIG. 3 shows a flow chart of the method performed by the invention.

The operation of the query generator software and database in generating and handling this query will now be described with reference to the flow chart shown in FIG. 3.

In order to generate the query to retrieve the data held in column C1 from view V along with the data held in column C2 from table T, the user selects these items in the query generator software in step 20.

Internally, the query tool stores a set of metadata that defines the items to be used in the query. In this case, the metadata would be as shown below:

Items: T.C2, V.C1

Reach Through Items: T.C2

Objects: T, V

As can be seen, a reach through property or flag has been set for item column C2 from table T, which is known as a reach through item. This is possible since view V is based on table T, and so the reach through flag can be set for column C2 from table T. This flag is typically set by the administrator of the software. By setting this flag, the administrator has indicated to the query generator software that it is able to invoke the invention in this case to avoid the creation of a redundant join.

In step 21, the query generator software analyses this set of metadata to see whether any of the selected items that are not exposed by the view V (in this case, column T.C2) are defined as reach through items.

Column C2 from table T is defined as a reach through item and the processing continues in step 22, which will be described below.

If however none of the items that are not exposed by the view were defined as reach through items then the query tool would proceed by creating a query as normal in step 23. This query will be an SQL query and is:

SELECT T.C2, V.C1

FROM T, V

WHERE T.C1=V.C1

However, in this case step 23 is not performed since T.C2 is defined as a reach through item. Thus, in step 22 the query tool creates a second view V' (see FIG. 2) of the database that is a copy of view V. The second view V' is a transient view that is created in memory at run time, whereas view V is stored in the database. When the view V' is created in memory, the definition is stored as metadata by the query tool, and this metadata includes the definition for the SQL for the definition of view V (i.e. as an inline view that is based on table T). However, it is important to realise that unlike view V, no metadata relating to view V' is stored in the database since this view is transient in nature.

A copy of the reach through item, that is column C2 from table T, is added to the second view V'. Additionally, a new set of metadata that define the query are generated, and these are:

Items: V'.C2', V'.C1'

Reach Through Items:

Objects: V'

As can be seen, this set of metadata indicates that items V'.C2' and V'.C1' should be retrieved from object V'. A standard SQL creation algorithm can then be invoked in step 24 to convert this set of metadata into the following SQL query:

SELECT C1', C2'

FROM V'

Since the view V' is based on table T and view V (which as described above is based on table T) the query will be converted into the following:

SELECT C1, C2

FROM T

As can be seen, this statement refers to table T only. It is possible to resolve the generated SQL to this statement since the definition for view V' incorporated the metadata definition of view V which is based on T. The use of the reach through flag enable this resolved SQL statement to be generated, which would not be possible otherwise since an SQL statement containing a join would then be created, and it is not possible to infer that these can be resolved in this way since a join is not necessarily created on related tables or views.

This query is then sent to the server 1 in step 25. In step 26, server 1 executes the query and retrieves the necessary data from database 2 and returns them to the originating client computer 3, 4 or 5.

The second view V' is stored in internal memory in the originating client computer 3, 4 or 5 rather than on the database which is where view V is stored. By virtue of this it is possible to access the additional metadata needed to create view V' extremely quickly, and this leads to the performance improvement brought about by the invention. When it has received the results, the query tool deletes the second view V' in step 27, as this was only needed transitorily in order to optimise the SQL statement for efficient execution.

As can be seen, the invention can operate in certain circumstances in order to improve the efficiency of automatically-generated SQL such that redundant joins and multiple references to the same table are not required.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD ROMs.

The invention claimed is:

1. A query generator, implemented in a computer system comprising a processor operable to execute computer program instructions, a memory operable to store computer program instructions executable by the processor and data to be processed by the processor, and computer program instructions stored in the memory and executable to implement the query generator, for generating a query for retrieving data from a database comprising at least one table, the query referring to one or more data items in a first view defined to expose a portion of the database and to one or more data items that are not exposed by the first view, at least one of which has an associated flag set that defines the at least one item having the flag set as an item that is to be included in a second view to avoid the creation of a redundant join, wherein the query generator is configured to:
   a) receive user input indicating selected items to be retrieved from the database;
   b) ascertain whether any of the selected items that are not exposed by the first view are defined as items that are to be included in a second view to avoid the creation of a redundant join; and,
   c) when any of the selected items that are not exposed by the first view are defined as items that are to be included in a second view to avoid the creation of a redundant join:
      i) create the second view that is a copy of the first view and add a copy of each item that is to be included in a second view to avoid the creation of a redundant join to the second view to avoid the creation of a redundant join; and
      ii) create a query that refers only to the second view and the items exposed by the second view.

2. A query generator according to claim 1, wherein the query generator is further adapted to execute the query on the database.

3. A query generator according to claim 2, wherein the query generator is further adapted to delete the second view after the query has been executed.

4. A query generator according to claim 1, wherein the first and second views are stored in separate memories.

5. A query generator according to claim 1, wherein the query is represented by the query generator as a set of metadata items indicating the items to be retrieved and the objects within which each of these items are stored.

6. A query generator according to claim 5, wherein the objects within which the items are stored include a table in the database.

7. A query generator according to claim 5, wherein the objects within which the items are stored include a view defined to expose a portion of the database.

8. A query generator according to claim 5, wherein the query is converted into an SQL query.

9. A query generator according to claim 1, wherein the database is a relational database.

10. A method, implemented in a computer system comprising computer hardware and software, for generating a query for retrieving data from a database comprising at least one table, the query referring to one or more data items in a first view defined to expose a portion of the database and to one or more data items that are not exposed by the first view, at least one of which has an associated flag set that defines the at least one item having the flag set as an item that is to be included in a second view to avoid the creation of a redundant join, wherein the method comprises:
   a) receiving user input indicating selected items to be retrieved from the database;
   b) ascertaining whether any of the selected items that are not exposed by the first view are defined as items that are to be included in a second view to avoid the creation of a redundant join; and,
   c) when any of the selected items that are not exposed by the first view are defined as items that are to be included in a second view to avoid the creation of a redundant join:
      i) creating a second view that is a copy of the first view and adding a copy of each item that is to be included in a second view to avoid the creation of a redundant join to the second view to avoid the creation of a redundant join; and
      ii) creating a query that refers only to the second view and the items exposed by the second view.

11. A method according to claim 10, wherein the method further comprises executing the query on the database.

12. A method according to claim 11, wherein the method further comprises deleting the second view after the query has been executed.

13. A method according to claim 10, wherein the method further comprises storing the first and second views in separate memories.

14. A method according to claim 10, wherein the query is represented as a set of metadata items indicating the items to be retrieved and the objects within which each of these items are stored.

15. A method according to claim 14, wherein the objects within which the items are stored include a table in the database.

16. A method according to claim 14, wherein the objects within which the items are stored include a view defined to expose a portion of the database.

17. A method according to claim 14, wherein the query is converted into an SQL query.

18. A computer program product comprising program code stored on a computer readable recordable-type storage medium for, when said program code is run on a computer generating a query for retrieving data from a database comprising at least one table, the query referring to one or more data items in a first view defined to expose a portion of the database and to one or more data items that are not exposed by the first view, at least one of which has an associated flag set that defines the at least one item having the flag set as an item that is to be included in a second view to avoid the creation of a redundant join, wherein the method comprises:
    a) receiving user input indicating selected items to be retrieved from the database;
    b) ascertaining whether any of the selected items that are not exposed by the first view are defined as items that are to be included in a second view to avoid the creation of a redundant join; and,
    c) when any of the selected items that are not exposed by the first view are defined as items that are to be included in a second view to avoid the creation of a redundant join:
        i) creating a second view that is a copy of the first view and adding a copy of each item that is to be included in a second view to avoid the creation of a redundant join to the second view to avoid the creation of a redundant join; and
        ii) creating a query that refers only to the second view and the items exposed by the second view.

\* \* \* \* \*